United States Patent [19]
Kagawa

[11] Patent Number: 6,023,303
[45] Date of Patent: Feb. 8, 2000

[54] VIDEO SIGNAL PROCESSING APPARATUS AND METHOD FOR PREVENTING A SIGNAL DROPOUT

[75] Inventor: Takashi Kagawa, Kanagawa, Japan

[73] Assignee: Sony Corporation, Tokyo, Japan

[21] Appl. No.: 08/791,226

[22] Filed: Jan. 30, 1997

[30] Foreign Application Priority Data

Feb. 1, 1996 [JP] Japan .................................. 8-038751

[51] Int. Cl.$^7$ ..................................................... H04N 5/94
[52] U.S. Cl. .......................... 348/616; 348/609; 348/607; 348/665; 386/21; 386/113; 386/114
[58] Field of Search .................... 348/616, 609, 348/607, 617, 665, 663; 386/2, 21, 22, 25, 47, 49, 113, 114, 115, 116; H04N 5/94

[56] References Cited

U.S. PATENT DOCUMENTS

| | | | |
|---|---|---|---|
| 4,245,262 | 1/1981 | Ohtsu ............................................ 358/8 |
| 4,490,748 | 12/1984 | Kamath .................... 358/314 |
| 4,510,530 | 4/1985 | Miura et al. ............................. 358/314 |
| 4,571,613 | 2/1986 | Fukuda ........................................... 348/665 |
| 4,684,976 | 8/1987 | Sugihara et al. ........................... 358/31 |
| 4,748,498 | 5/1988 | Yamanishi et al. ........................ 358/36 |
| 4,750,033 | 6/1988 | Fukuda et al. ............................ 358/31 |
| 4,771,341 | 9/1988 | Shimizu et al. ............................ 386/25 |
| 4,786,978 | 11/1988 | Kawasaki ................................... 386/25 |
| 4,807,050 | 2/1989 | Takeuchi et al. ........................ 358/328 |
| 4,827,342 | 5/1989 | Ohta et al. ................................ 358/167 |
| 4,843,457 | 6/1989 | Yamagata ................................... 358/31 |
| 4,849,808 | 7/1989 | Rossi ......................................... 358/31 |
| 4,930,005 | 5/1990 | Yamada et al. ............................ 386/22 |
| 5,016,111 | 5/1991 | Sakamoto et al. ........................ 386/21 |
| 5,047,866 | 9/1991 | Watanabe et al. ........................ 386/25 |
| 5,166,794 | 11/1992 | Tanaka ..................................... 358/167 |
| 5,280,396 | 1/1994 | Hamaguchi et al. ........................ 386/2 |
| 5,291,278 | 3/1994 | Nishigori .................................. 348/665 |
| 5,333,054 | 7/1994 | Tanaka et al. ........................... 348/666 |
| 5,398,114 | 3/1995 | Han .......................................... 348/616 |
| 5,448,305 | 9/1995 | Hagino .................................... 348/665 |
| 5,587,804 | 12/1996 | Moon et al. ................................. 386/2 |
| 5,633,689 | 5/1997 | Willis et al. ............................. 348/663 |
| 5,640,211 | 6/1997 | Kawano et al. ........................ 348/663 |

Primary Examiner—John K. Peng
Assistant Examiner—Jean W. Désir
Attorney, Agent, or Firm—Frommer Lawrence & Haug, LLP.; William S. Frommer

[57] ABSTRACT

An output signal of an 1H delaying circuit and a signal received from an input terminal are supplied to a subtracting circuit that forms a comb line filter. Thus, even if a dropout takes place in a luminance signal, not in a chroma signal, the chroma signal can be obtained from an output signal at intervals of 1H. When a dropout takes place, a limit operation of a feedback loop that forms a noise reduction circuit is stopped and the coefficient is increased. This process is performed with a dropout pulse that is delayed by 1H. Thus, the chroma signal can be obtained on the next line of the line having the dropout.

6 Claims, 5 Drawing Sheets

VIDEO SIGNAL PROCESSING APPARATUS AND METHOD FOR PREVENTING A SIGNAL DROPOUT

BACKGROUND OF THE INVENTION

1. Field of the Invention

The present invention relates to a video signal processing circuit for allowing a 1H (one horizontal interval) delaying circuit in a reproducing system of a VCR to perform both processes for compensating a dropout and for removing a crosstalk of a chroma signal.

2. Description of the Related Art

In a helical scan type VCR, a luminance signal is frequency-modulated, and a chroma signal is converted into a low band frequency signal so as to record the resultant signal on a magnetic tape. In such a VCR, a video signal is recorded on tracks of the magnetic tape by heads with different azimuth angles in such a manner that adjacent tracks are recorded by the heads with the different azimuth angles to prevent a crosstalk between the adjacent tracks. However, the azimuth loss does not well work for a low frequency signal such as a chroma signal. In the NTSC system, to prevent such a problem (namely to remove a crosstalk component of the chroma signal), the phase of the chroma signal is inverted at each horizontal interval on tracks recorded by a head with a first azimuth angle. When the record signal is reproduced, the crosstalk component of the chroma signal is removed. This method is referred to as PI (Phase Invert) method. A comb line filter is composed of a 1H delaying circuit and a subtracting circuit so as to subtract a signal delayed by 1H from the current signal.

In some VCRs, the 1H delaying circuit used for the comb line filter that removes a crosstalk component of the chroma signal is used in common with a 1H delaying circuit used for a dropout compensating process. In such VCRs, a dropout detecting circuit detects an occurrence of a dropout. When the dropout detecting circuit detects a dropout, the signal having the dropout is substituted with a signal of 1H prior. To hold the signal of 1H prior, a 1H delaying circuit is disposed. The 1H delaying circuit that compensates the dropout is used in common with the 1H delaying circuit for the comb line filter that removes the crosstalk component of the chroma signal.

Figure 1:
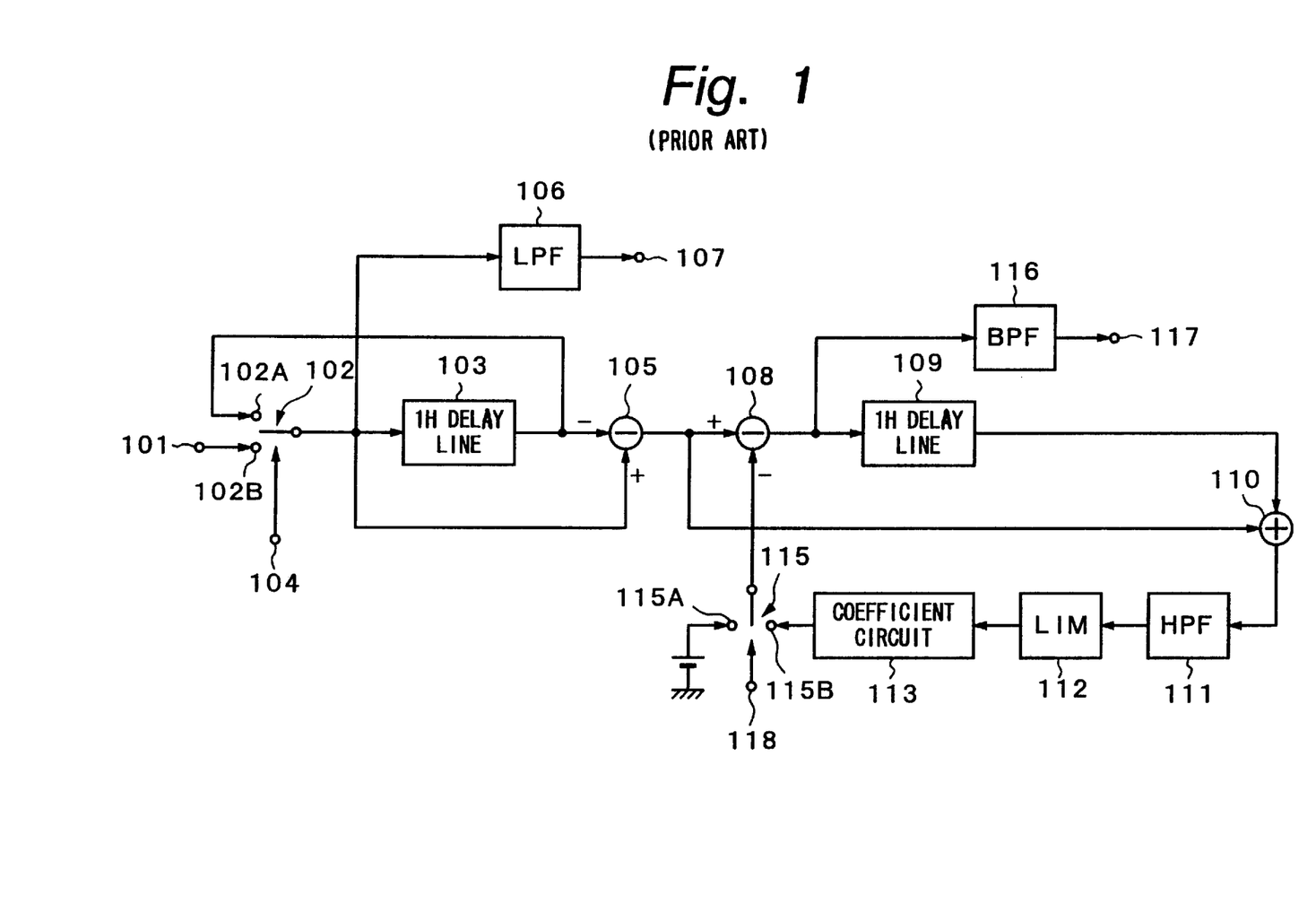
FIG. 1 is a block diagram showing an example of a conventional video signal processing circuit.

FIG. 1 shows an example of a conventional circuit that performs both processes for removing the crosstalk of the chroma signal and for compensating the dropout. In this example, the circuit shown in FIG. 1 processes an NTSC video signal.

In FIG. 1, reference numeral 101 is an input terminal. A composite signal of a reproduction chroma signal and a reproduction luminance signal that have been reproduced from a magnetic tape and converted into signals with an original carrier frequency $f_{sc}$ (=3.58 MHZ) by a frequency converting circuit is supplied to an input terminal 101. The composite signal is supplied from the input terminal 101 to a terminal 102B of a switch circuit 102. An output signal of a 1H delaying circuit 103 is supplied to the other terminal 102A of the switch circuit 102.

A dropout detection pulse is supplied from a terminal 104 to the switch circuit 102. When no dropout takes place, the switch circuit 102 is connected to the terminal 102B. When a dropout takes place, the switch circuit 102 is connected to the terminal 102A.

The 1H delaying circuit 103 and a subtracting circuit 105 form a comb line filter that extracts a reproduction chroma signal component from the input signal and removes a crosstalk component of the chroma signal.

In other words, an output signal of the switch circuit 102 is supplied to the subtracting circuit 105. In addition, the output signal of the switch circuit 102 is supplied to the subtracting circuit 105 through the 1H delaying circuit 103. The subtracting circuit 105 subtracts the signal of 1H prior from the signal of the current line.

In the NTSC system, the chroma signal of each line correlates. In addition, the phase of the chroma signal inverts, line by line. Thus, when the signal of 1H prior is subtracted from the signal of the current line by the 1H delaying circuit 103 and the subtracting circuit 105, the luminance signal component is canceled. Thus, only the chroma signal component is left. At this point, in the PI system, since the phase of the chroma signal of each line is inverted on tracks with a first azimuth angle, the crosstalk component is canceled.

When a dropout takes place, the 1H delaying circuit 103 holds a reproduction signal. In other words, the output signal of the 1H delaying circuit 103 is supplied to the terminal 102A of the switch circuit 102. As described above, when a dropout takes place, the switch circuit 102 is connected to the terminal 102A. Thus, the signal held in the 1H delaying circuit 103 is supplied to the low pass filter 106 through the switch circuit 102. The luminance signal of the preceding line is substituted with the luminance signal having the dropout. The resultant signal is output from an output terminal 107.

A subtracting circuit 108, a 1H delaying circuit 109, an adding circuit 110, a high pass filter 111, a limiter 112, and a coefficient circuit 113 operate as a line correlation cyclic type chroma signal noise reduction circuit.

In other words, an output signal of the subtracting circuit 105 is supplied to the subtracting circuit 108. In addition, the output signal of the subtracting circuit 105 is supplied to the adding circuit 110. An output signal of the subtracting circuit 108 is supplied to the adding circuit 110 through the 1H delaying circuit 109.

In the NTSC system, the chroma signal of each line correlates. In addition, the phase of the chroma signal inverts, line by line. Thus, when the adding circuit 110 adds the chroma signal of the current line and the chroma signal delayed by 1H received from the 1H delaying circuit 109, the chroma signal component is canceled. Thus, only the noise component is left.

The noise component is supplied to the high pass filter 111 and the limiter 112 that limit the frequence band and the amplitude, respectively. An output signal of the limiter 112 is supplied to the coefficient circuit 113 that controls the gain. An output signal of the coefficient circuit 113 is fed back to the subtracting circuit 108 through a switch circuit 115. The subtracting circuit 108 removes the noise component from the chroma signal.

An output signal of the subtracting circuit 108 is supplied to a band pass filter 116. The band pass filter 116 extracts the chroma signal. The chroma signal is supplied from an output terminal 117.

The switch circuit 115 activates the noise reduction circuit depending on whether or not the luminance signal correlates. A Y correlation signal representing whether or not the luminance signal correlates is supplied from a terminal 118 to the switch circuit 115. When the luminance signal strongly correlates, the switch circuit 115 is connected to a terminal 115B. Thus, the above-described noise reduction circuit operates. When the luminance signal less correlates, the switch circuit 115 is connected to a terminal 115A. Thus, a predetermined level is applied to the subtracting circuit 108 and thereby a feedback loop is formed. Consequently, the noise reduction circuit does not operate.

As described above, in the circuit that performs both processes for compensating the dropout and for removing the crosstalk of the chroma signal, when a dropout takes place, the switch circuit 102 is connected to the terminal 102A. Thus, the signal of the preceding line held in the 1H delaying circuit 103 is substituted to the signal having the dropout. However, in such a conventional structure, if a dropout takes place in the luminance signal, not in the chroma signal, the chroma signal is lost.

In other words, in the conventional structure, when a dropout takes place, the 1H delaying circuit 103 continuously outputs the signal of the same line. Thus, the subtracting circuit 105 subtracts the signal of the same line. Consequently, the chroma signal is canceled. Thus, even if no dropout takes place in the chroma signal; the chroma signal is lost.

To solve such a problem, as disclosed in Japanese Patent Application No. 7-155380, the applicant of the present invention has proposed a structure of which a dropout detection signal causes a limiter of a noise reduction circuit to be skipped so that a signal having a dropout is substituted with the signal of the preceding line. However, in such a circuit, when dropouts take place on many lines, the level of the chroma signal is gradually deteriorated by the coefficient circuit. To prevent this problem, a new coefficient should be provided.

Moreover, as described above, in the structure for compensating dropouts of the chroma signal, a dropout signal that synchronizes with the line with a dropout is used. However, with such a dropout signal, the next line of the line with the dropout is affected. This is because dropout information is held in the 1H delaying circuit on the next line of the line with the dropout. The dropout information circulates in the feedback loop of the noise reduction circuit. Thus, the chroma signal is canceled.

OBJECTS AND SUMMARY OF THE INVENTION

Therefore, an object of the present invention is to provide a video signal processing apparatus that outputs a reproduction chroma signal even if a dropout takes place in a reproduction luminance signal, not in the reproduction chroma signal.

The present invention is a video signal processing circuit, comprising a switch circuit with first and second input terminals, a reproduction signal corresponding to the NTSC system being input to the first input terminal, an output signal of a first line delaying circuit being supplied to the second input terminal, a comb line filter for subtracting the reproduction signal from a reproduction signal supplied through the first line delaying circuit, and a feedback type noise reduction circuit for extracting noise components from the reproduction signal and a reproduction chroma signal supplied through a second line delaying circuit, feeding back the noise components, and removing the noise components from the reproduction chroma signal, wherein when a dropout takes place, the switch circuit is connected to the first line delaying circuit so that the first line delaying circuit holds the reproduction signal that does not have the dropout, wherein the comb line filter subtracts an output signal of the first line delaying circuit from the reproduction signal that is input to the first terminal of the switch circuit, and wherein an amplitude limiting element and an attenuating element of the feedback loop that forms the feedback type noise reduction circuit are removed.

In the present invention, the amplitude limiting element and the attenuating element in the feedback loop that forms the feedback type noise reduction circuit are controlled with a pulse that is longer by one line than the dropout pulse.

The present invention is a video signal processing circuit, comprising a switch circuit with first and second input terminals, a reproduction signal corresponding to the NTSC system or PAL system being input to the first input terminal, an output signal of a first line delaying circuit being supplied to the second input terminal, a comb line filter for subtracting the reproduction signal from a reproduction signal supplied through the first line delaying circuit in the NTSC system or for subtracting the reproduction signal from a reproduction signal supplied through the first line delaying circuit and a second line delaying circuit in the PAL system, and a feedback type noise reduction circuit for extracting noise components from the reproduction signal and a reproduction chroma signal supplied through a second line delaying circuit, feeding back the noise components, and removing the noise components from the reproduction chroma signal in the NTSC system or for extracting noise components from the reproduction signal and a reproduction chroma signal supplied through the first line delaying circuit and the second line delaying circuit, feeding back the noise components, and removing the noise components from the reproduction chroma signal in the PAL system, wherein when a dropout takes place, the switch circuit is connected to the first line delaying circuit so that the first line delaying circuit holds the reproduction signal that does not have the dropout, the comb line filter subtracts an output signal of the first line delaying circuit from the reproduction signal that is input to the first terminal of the switch circuit, and an amplitude limiting element and an attenuating element of the feedback loop that forms the feedback type noise reduction circuit are removed in the NTSC system, and wherein when a dropout takes place, the switch circuit is connected to the first line delaying circuit so that the first line delaying circuit holds the reproduction signal that does not have the dropout, and an amplitude limiting element and an attenuating element of the feedback loop that forms the feedback type noise reduction circuit are removed in the PAL system.

In the present invention, the amplitude limiting element and the attenuating element in the feedback loop that forms the feedback type noise reduction circuit are controlled with a pulse that is longer by one line than the dropout pulse in the NTSC system or with the dropout pulse in the PAL system.

An output signal of an 1H delaying circuit and a signal received from an input terminal are supplied to a subtracting circuit that forms a comb line filter. Thus, even if a dropout takes place in a luminance signal, not in a chroma signal, the chroma signal can be obtained from an output signal at intervals of 1H. When a dropout takes place, a limit operation of a feedback loop that forms a noise reduction circuit is stopped and the coefficient is increased. This process is performed with a dropout pulse that is delayed by 1H. Thus, the chroma signal can be obtained on the next line of the line having the dropout.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 2:
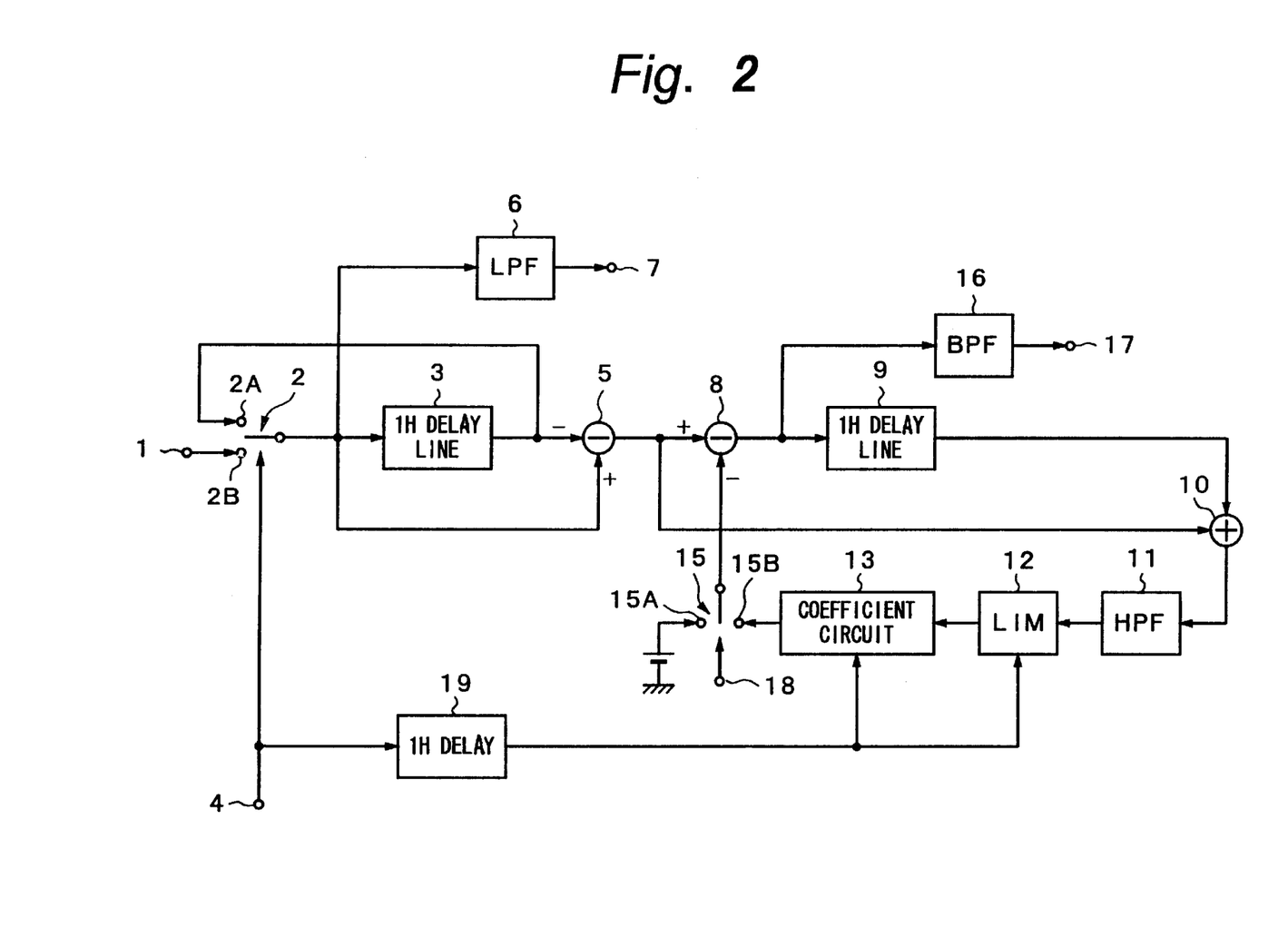
FIG. 2 is a block diagram showing an embodiment of the present invention.

Next, with reference to the accompanying drawings, an embodiment of the present invention will be described. FIG. 2 shows an example of a video signal processing circuit according to the present invention. In this example, an NTSC video signal is processed.

In FIG. 2, reference numeral 1 is an input terminal. A composite signal of a reproduction chroma signal and a reproduction luminance signal that have been reproduced from a tape and converted into signals with original carrier frequency $f_{sc}$ (=3.58 MHz) is supplied to the input terminal 1. The composite signal received from the input terminal 1 is supplied to a terminal 2B of a switch circuit 2. An output signal of a 1H delaying circuit 3 is supplied to the other terminal 2A of the switch circuit 2.

When no dropout takes place, the switch circuit 2 is switched so that the 1H delaying circuit 3 removes a crosstalk of the chroma signal. When a dropout takes place, the switch circuit 2 is switched so that the 1H delaying circuit 3 compensates the dropout. A dropout pulse is supplied from a terminal 4 to the switch circuit 2. When no dropout takes place, the switch circuit 2 is connected to the terminal 2B. When a dropout takes place, the switch circuit 2 is connected to the terminal 2A.

When no dropout takes place, the 1H delaying circuit 3 and a subtracting circuit 5 form a comb line filter that extracts a reproduction chroma signal component from the input signal and removes the crosstalk component of the chroma signal.

In other words, when no dropout takes place, the switch circuit 2 is connected to the terminal 2B. The composite signal of the reproduction luminance signal and the reproduction chroma signal received from the input terminal 1 is supplied to the 1H delaying circuit 3. In addition, the composite signal is supplied to the subtracting circuit 5. An output signal of the 1H delaying circuit 3 is supplied to the subtracting circuit 5. The subtracting circuit 5 subtracts the signal of 1H prior from the signal of the current line. In the NTSC system, the chroma signal of each lines correlates. The phase of the chroma signal inverts, line by line. Thus, when the signal of 1H prior is subtracted from the line of the current line, the luminance signal component is canceled. Consequently, only the chroma signal component is left. In the PI system, since the phase of the chroma signal on tracks with a first azimuth angle inverts, line by line. Thus, at this point, the crosstalk component of the chroma signal is canceled.

When a dropout takes place, the 1H delaying circuit 3 holds the luminance signal of 1H prior and substitutes the signal having the dropout with the signal of 1H prior.

In other words, when a dropout takes place, the switch circuit 2 is connected to the terminal 2A. Thus, the signal held in the 1H delaying circuit 3 is supplied to the low pass filter 6 through the switch circuit 2. The low pass filter 6 extracts the luminance signal component from the input signal. An output signal of the low pass filter 6 is supplied from an output terminal 7. When a dropout takes place, the signal held in the 1H delaying circuit 3 is output from the output terminal 7 through the switch circuit 2 and the low pass filter 6. The signal of 1H prior is substituted with the signal having dropout.

A subtracting circuit 8, a 1H delaying circuit 9, an adding circuit 10, a high pass filter 11, a limiter 12, and a coefficient circuit 13 operate as a line correlation cyclic type chroma signal noise reduction circuit.

In other words, the subtracting circuit 5 outputs the reproduction chroma signal. The reproduction chroma signal is supplied to the subtracting circuit 8 and the adding circuit 10. An output signal of the subtracting circuit 8 is supplied to the adding circuit 10 through the 1H delaying circuit 9.

In the NTSC system, the chroma signal of each 1H correlates. In addition, the phase of the chroma signal inverts for each 1H. Thus, when the adding circuit 10 adds the chroma signal of the current line and the chroma signal delayed for one line by the 1H delaying circuit 9, the chroma signal component is canceled. Thus, the noise component is left. The noise component is supplied to the high pass filter 11 and the limiter 12 that limit the band and amplitude, respectively. The resultant noise component is supplied to the coefficient circuit 13 that controls the gain. The resultant signal is fed back to the subtracting circuit 8 through the switch circuit 15. The subtracting circuit 8 removes the noise component of the chroma signal supplied from the subtracting circuit 5.

An output signal of the subtracting circuit 8 is supplied to a band pass filter 16. The band pass filter 16 extracts the chroma signal component from the output signal of the subtracting circuit 8. The chroma signal is supplied from an output terminal 17.

The switch circuit 15 activates the noise reduction circuit depending on whether or not the luminance signal correlates for each line. A Y correlation signal representing whether or not the luminance signal correlates is supplied from a terminal 18 to the switch circuit 15. When the luminance signal strongly correlates, the switch circuit 15 is connected to a terminal 15B and thereby the noise reduction circuit operates. When the luminance signal weakly correlates, the switch circuit 15 is connected to a terminal 15A. At this point, since the feedback loop is lost, the noise reduction circuit does not operate.

A dropout pulse is supplied from the terminal 4 to the limiter 12 and the coefficient circuit 13 through a 1H delaying circuit 19. Thus, when a dropout takes place, the limit operation of the limiter 12 is stopped. In addition, the coefficient of the coefficient circuit 13 is increased. With the 1H delaying circuit 19, the above-described operations of which the limit operation of the limiter 12 is stopped and the coefficient of the coefficient circuit 13 is increased are delayed by 1H after the dropout takes place.

Thus, the subtracting circuit 5 supplies the output signal of the 1H delaying circuit 3 and the output signal of the switch circuit 2 to the subtracting circuit 8. In this example, the output signal of the 1H delaying circuit 3 and the signal received from the input terminal 1 are supplied to the subtracting circuit 5. Thus, even if a dropout takes place in the luminance signal, not in the chroma signal, the chroma signal can be obtained from the subtracting circuit 5 at intervals of 1H.

In other words, when a dropout takes place in the luminance signal, the signal level of the dropout pulse (see FIG. 3D) becomes "H" and thereby the switch circuit 2 is connected to the terminal 2A. While a dropout takes place in the luminance signal, the chroma signal of the same line is output from the 1H delaying circuit 3. The chroma signal is supplied to the subtracting circuit 5.

Figure 3A:
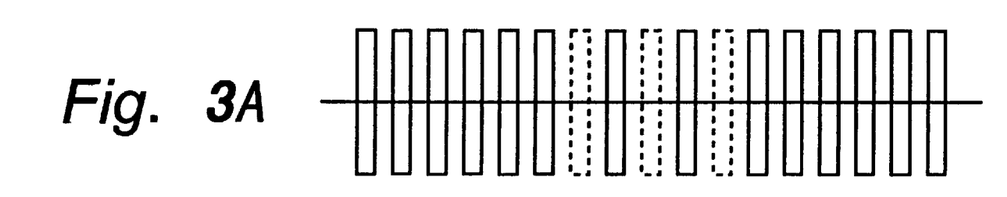
FIGS. 3A to 3E are schematic diagrams for explaining the embodiment of the present invention.

The chroma signal received from the input terminal 1 is supplied to the subtracting circuit 5. In the NTSC system, since the phase of the chroma signal inverts, line by line, the phase of the chroma signal that is output from the 1H delaying circuit 3 is different from the phase of the chroma signal that is input from the input terminal 1 at intervals of 1H. When no dropout takes place in the luminance signal (at this point, the chroma signal does not drop out), the chroma signal can be obtained from the subtracting circuit 5 at intervals of 1H as shown in FIG. 3A.

Figures 3B, 3C:
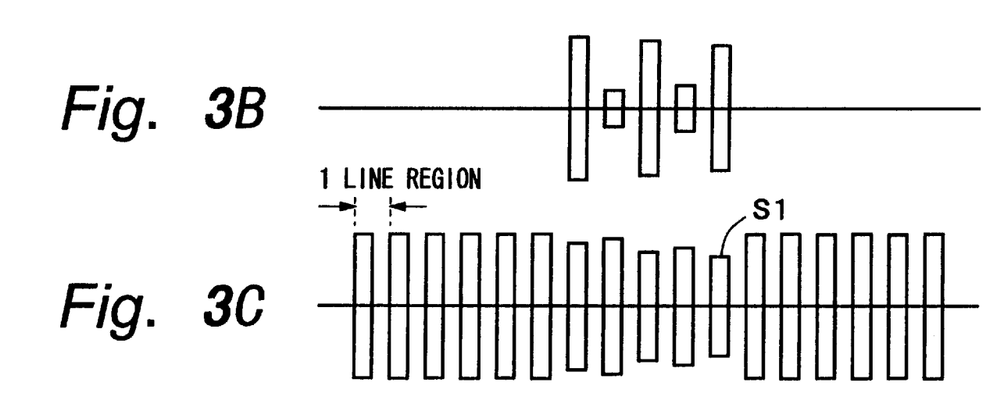
Figures 3D, 3E:
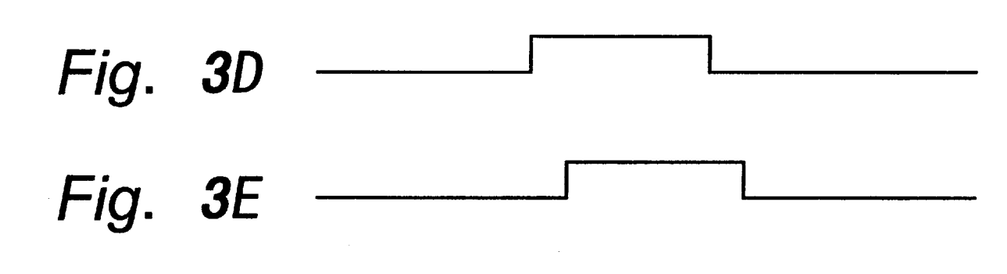

The output signal is supplied through the noise reduction circuit composed of the subtracting circuit 8, the 1H delaying circuit 9, the adding circuit 10, the high pass filter 11, the limiter 12, and the coefficient circuit 13. While a dropout takes place in the luminance signal, the limiting operation of the limiter is stopped. In addition, the coefficient of the coefficient circuit 13 is increased. While a dropout takes place in the luminance signal, the coefficient circuit 13 outputs a signal as shown in FIG. 3B. In addition, the noise reduction circuit outputs the chroma signal as shown in FIG. 3C.

The signal received from the input terminal 1 is supplied to the subtracting circuit 5. While a dropout takes place, the operation of the limiter 12 in the noise reduction circuit is stopped. In addition, the coefficient of the coefficient circuit 13 is increased. Thus, even if a dropout takes place in the luminance signal, not in the chroma signal, the chroma signal can be obtained as shown in FIG. 3C.

However, with such a process, the chroma signal is not output on the next line of the line having the dropout. In other words, the signal denoted by S1 in FIG. 3C is not output. This is because on the next line of the line having the dropout, the chroma signal is held in the 1H delaying circuit 9. Thus, after the chroma signal is supplied in the loop of the noise reduction circuit and thereby no dropout takes place, if the limiter 12 is turned on, the chroma signal is not circulated. Consequently, on the next line of the line having the dropout, the chroma signal is lost. Such a situation takes place in the case that dropouts successively take place out on odd lines.

To prevent such a problem, a dropout pulse is supplied to the limiter 12 and the coefficient circuit 13 through the 1H delaying circuit 19. With the dropout pulse delayed by 1H (see FIG. 3E), the process for stopping the operation of the limiter 12 is delayed by 1H after the dropout takes place. Thus, on the next line of the line having the dropout, the chroma signal denoted by S1 can be obtained.

Figure 4:
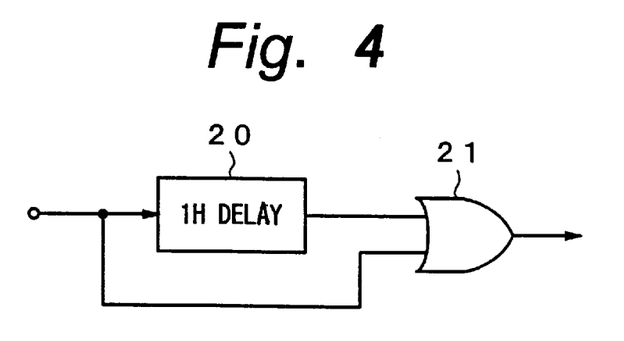
FIG. 4 is a block diagram for explaining a delaying circuit according to the embodiment of the present invention.
Figure 5A:
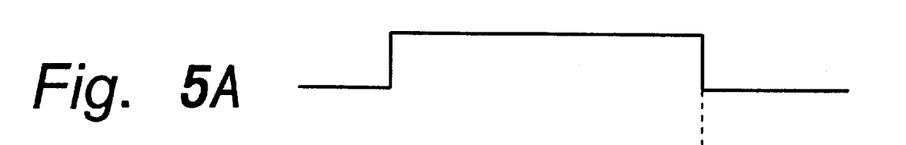
FIGS. 5A and 5B are schematic diagrams for explaining the delaying circuit according to the embodiment of the present invention.
Figure 5B:
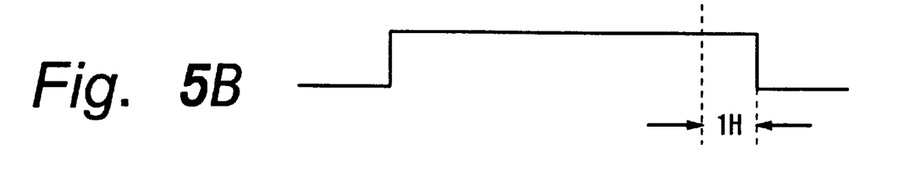

In the above-described example, the dropout pulse is supplied to the limiter 12 and the coefficient circuit 13 through the 1H delaying circuit 19. However, a structure as shown in FIG. 4 may be used. In the structure, with a 1H delaying circuit 20 and an OR gate 21, the pulse width of the dropout pulse is increased for 1H. The resultant pulse is supplied to the limiter 12 and the coefficient circuit 13 through the 1H delaying circuit 19. In FIG. 4, the dropout pulse is supplied to one input terminal of the OR gate 21. In addition, the dropout pulse is supplied to the other input terminal of the OR gate 21 through the 1H delaying circuit 20. Thus, when the dropout pulse as shown in FIG. 5B is supplied, a dropout pulse whose pulse width is increased is output from the OR gate 21 as shown in FIG. 5B.

Figure 6:
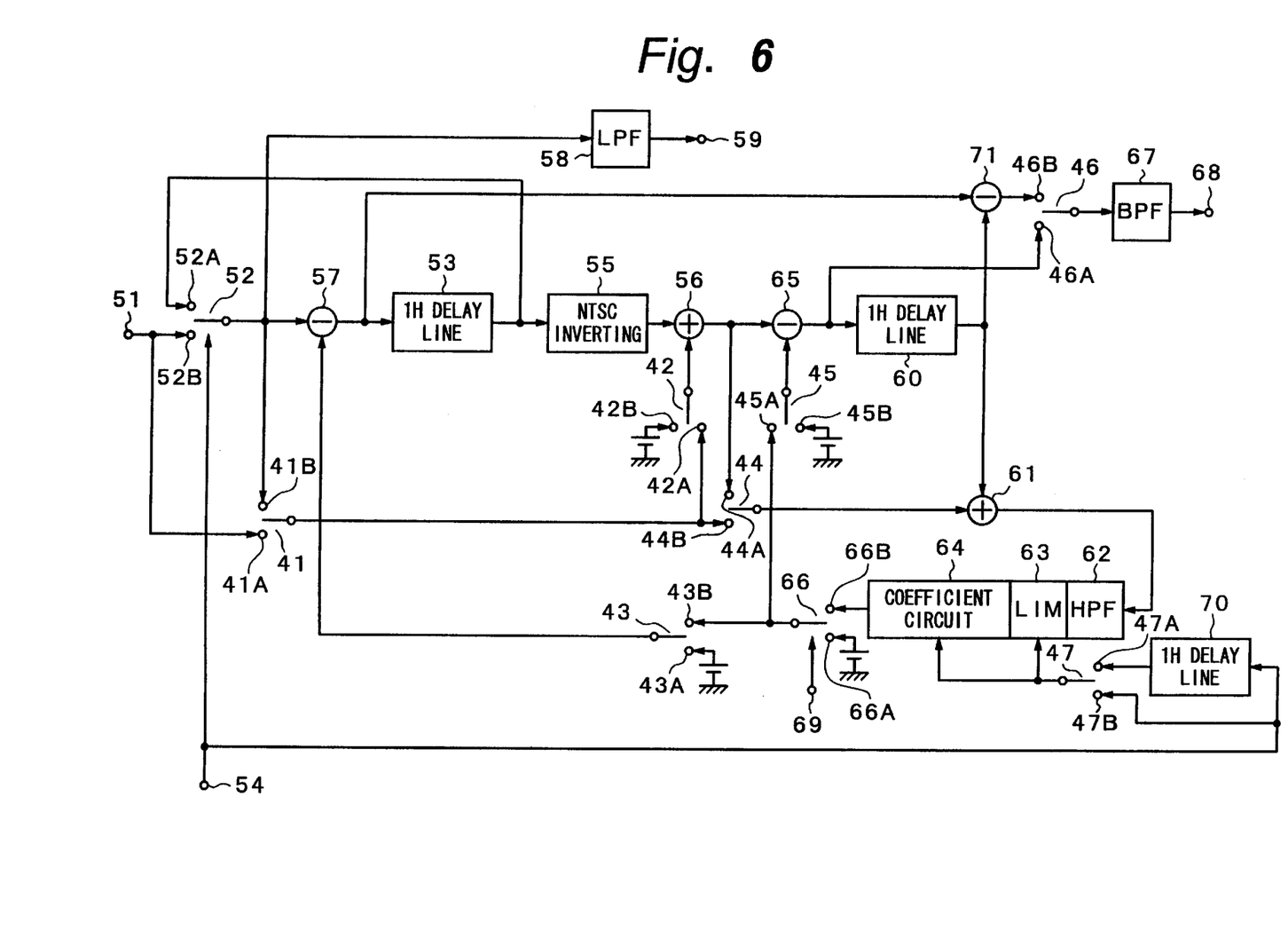
FIG. 6 is a block diagram according to another embodiment of the present invention.

FIG. 6 is a block diagram showing a structure of which both the NTSC system and the PAL system can be used. In FIG. 6, reference numerals 41 to 47 are switch circuits that are switched depending on whether the NTSC system or the PAL system is selected. In the NTSC system, the switches 41 to 47 are connected to terminals 41A to 47A, respectively. On the other hand, in the PAL system, the switches 41 to 47 are connected to terminals 41B to 47B, respectively.

In the NTSC system, a composite signal of which a reproduction chroma signal and a reproduction luminance signal that have been reproduced from a tape and converted into signals with an original carrier frequency by a frequency converting circuit is supplied to an input terminal 51. The composite signal is supplied to a terminal 52B of a switch circuit 52. An output signal of a 1H delaying circuit 53 is supplied to the other terminal 52A of the switch circuit 52.

When no dropout takes place, the switch circuit 52 is switched so that the 1H delaying circuit 53 removes a crosstalk of the chroma signal. When a dropout takes place, the switch circuit 52 is switched so that the 1H delaying circuit 53 compensates the dropout. In addition, a dropout pulse is supplied from a terminal 54 to the switch circuit 52. When no dropout takes place, the switch circuit 52 is connected to the terminal 52B. When the dropout takes place, the switch circuit 52 is connected to the terminal 52A.

When no dropout takes place, a 1H delaying circuit 53, an inverting circuit 55, and an adding circuit 56 form a comb line filter that extracts a reproduction chroma signal component from the input signal and removes a crosstalk component from the chroma signal.

In other words, when no dropout takes place, the switch circuit 52 is connected to the terminal 52B. The composite signal of the reproduction luminance signal and the reproduction chroma signal received from the input terminal 51 is supplied to the adding circuit 56 through the switch circuit 52, the subtracting circuit 57, the 1H delaying circuit 53 that delays the signal by 1H, and the inverting circuit 55 that inverts the phase of the signal. In the NTSC system, the inverting circuit 55 inverts the phase of the signal. In the PAL system, the inverting circuit 55 does not invert the phase of the signal.

In the NTSC system, the switch circuit 41 is connected to the terminal 41A. In addition, the switch circuit 42 is connected to the terminal 42A. Thus, the composite signal of the reproduction luminance signal and the reproduction chroma signal is supplied from the input terminal 51 to the adding circuit 56 through the switch circuits 41 and 42. Since the adding circuit 56 adds the signal that has been delayed by 1H by the 1H delaying circuit 53 and inverted by the inverting circuit 55 and the input signal supplied from the input terminal 51, the adding circuit 56 subtracts the signal of 1H prior from the signal of the current line. Thus, the luminance signal component is canceled. Thereby, the chroma signal component is left. At this point, the crosstalk component of the chroma signal is canceled.

When a dropout takes place, since the 1H delaying circuit 53 holds the luminance signal of 1H prior so as to substitute the signal having the dropout with the signal of 1H prior.

In other words, when a dropout takes place, the switch circuit 52 is connected to the terminal 52A. Thus, the signal held in the 1H delaying circuit 53 is supplied to a low pass filter 58 through the switch circuit 52. The low pass filter 58 extracts the luminance signal component. Thus, when a dropout takes place, the signal held in the 1H delaying circuit 53 is supplied from the output terminal 59 through the switch circuit 52 and the low pass filter 58. The signal having the dropout is substituted with the signal of 1H prior held in the 1H delaying circuit 53.

A 1H delaying circuit 60, an adding circuit 61, a high pass filter 62, a limiter 63, and a coefficient circuit 64 operate as a line correlation cyclic type chroma signal noise reduction circuit.

In other words, a reproduction chroma signal is output from the adding circuit 56. In the NTSC system, since the switch circuit 44 is connected to the terminal 44A, an output signal of the adding circuit 56 is supplied to the subtracting circuit 65. In addition, the output signal of the adding circuit 56 is supplied to the adding circuit 61 through the switch circuit 44. An output signal of the subtracting circuit 65 is supplied to the adding circuit 61 through the 1H delaying circuit 60.

The adding circuit 61 adds the chroma signal of the current line and the chroma signal delayed by 1H supplied from the 1H delaying circuit 60. Thus, the chroma signal component is canceled. Consequently, the noise component is left. The noise component is supplied to the high pass filter 62 and the limiter 63 that limit the band and amplitude, respectively. The resultant noise component is supplied to the coefficient circuit 64 that controls the gain. In the NTSC system, since the switch circuit 45 is connected to the terminal 45A, the signal is fed back to the subtracting circuit 65 through the switch circuit 66 and the switch circuit 45. The subtracting circuit 65 removes the noise component of the chroma signal.

In the NTSC system, the switch circuit 46 is connected to the terminal 46A. Thus, an output signal of the subtracting circuit 65 is supplied to a band pass filter 67 through the switch circuit 46. The band pass filter 67 extracts the chroma signal component. The chroma signal is supplied from an output terminal 68.

The switch circuit 66 activates the noise reduction circuit corresponding to whether or not the luminance signal correlates. A Y correlation signal representing whether the luminance signal correlates is supplied from a terminal 69 to the switch circuit 66. When the signal strongly correlates, the switch circuit 66 is connected to the terminal 66B. Thus, the above-described noise reduction circuit operates. When the signal less correlates, the switch circuit 66 is connected to the terminal 66A. At this point, the feedback loop is lost. Thus, the noise reduction circuit does not operate.

In the NTSC system, the switch circuit 47 is connected to the terminal 47. Thus, the dropout pulse received from the terminal 54 is supplied to the limiter 63 and the coefficient circuit 64 through the 1H delaying circuit 70. Thus, when a dropout takes place, the operation of the limiter 63 is stopped. In addition, the coefficient of the coefficient circuit 64 is increased. With the 1H delaying circuit 70, the above-described operations of which the limit operation of the limiter 63 is stopped and the coefficient of the coefficient circuit 64 is increased are delayed by 1H after the dropout takes place.

In the PAL system, a composite signal of a reproduction chroma signal and a reproduction luminance signal that have been reproduced from a tape and converted into signals with an original carrier frequency is supplied to the input terminal 51. The composite signal is supplied to the terminal 52B of the switch circuit 52. An output signal of the 1H delaying circuit 53 is supplied to the other terminal 52A of the switch circuit 52.

When no dropout takes place, the switch circuit 52 is switched so that the 1H delaying circuit 53 removes a crosstalk of the chroma signal. When a dropout takes place, the switch circuit 52 is switched so that the 1H delaying circuit 53 compensates the dropout. A dropout pulse is supplied from the terminal 54 to the switch circuit 52. When no dropout takes place, the switch circuit 52 is connected to the terminal 52B. When a dropout takes place, the switch circuit 52 is connected to the terminal 52A.

When no dropout takes place, the 1H delaying circuit 53, the 1H delaying circuit 60, and a subtracting circuit 71 forms a comb line filter that extracts the reproduction chroma signal component from the input signal and removes the crosstalk component of the chroma signal.

In other words, when no dropout takes place, the switch circuit 52 is connected to the terminal 52B. The composite signal of the reproduction luminance signal and the reproduction chroma signal received from the input terminal 51 is supplied to a subtracting circuit 71 through the switch circuit 52, the subtracting circuit 57, the 1H delaying circuit 53, the adding circuit 56, the subtracting circuit 65, and the 1H delaying circuit 60. In addition, the composite signal is supplied to a subtracting circuit 71 through the switch circuit 52 and the subtracting circuit 57. In the PAL system, the inverting circuit 55 does not operate. Thus, the subtracting circuit 71 subtracts the signal delayed by 2H received from the 1H delaying circuits 53 and 60 from the signal of the current line. Consequently, the luminance signal component is canceled and the chroma signal component is left. At this point, the crosstalk component of the chroma signal is canceled.

When a dropout takes place, the 1H delaying circuit 53 holds the luminance signal of 1H prior so as to substitute the signal having the dropout with the signal of 1H prior.

In other words, when a dropout takes place, the switch circuit 52 is connected to the terminal 52A. Thus, the signal held in the 1H delaying circuit 53 is supplied to the low pass filter 58 through the switch circuit 52. The low pass filter 58 extracts the luminance signal component. An output signal of the low pass filter 58 is supplied from the output terminal 59. Thus, when a dropout takes place, the signal held in the 1H delaying circuit 53 is supplied from the output terminal 59 through the switch circuit 52 and the low pass filter 58. The signal having the dropout is substituted with the signal of 1H prior held in the 1H delaying circuit 53.

The 1H delaying circuits 53 and 60, the adding circuit 61, the high pass filter 62, the limiter 63, the coefficient circuit 64, and the subtracting circuit 57 operates as a feedback type noise reduction circuit.

In other words, the adding circuit 61 adds the chroma signal of the current line and the chroma signal delayed by 2H. In the PAL system, the chroma signal correlates at intervals of 2H. Thus, when the chroma signal of the current line and the chroma signal delayed by 2H are added, the chroma signal component is canceled. Consequently, the noise component is left. The noise component is supplied to the high pass filter 62 and the limiter 63 that limit the band and amplitude, respectively. The resultant noise component is supplied to the coefficient circuit 64 that controls the gain. Thereafter, the resultant signal is fed back to the subtracting circuit 57 through the switch circuits 66 and 43. The subtracting circuit 57 removes the noise component from the chroma signal.

In the PAL system, the switch circuit 46 is connected to the terminal 46B. Thus, an output signal of the subtracting circuit 71 is supplied to the band pass filter 67 through the switch circuit 46. The band pass filter 67 extracts the chroma signal component. The chroma signal component is supplied from the output terminal 68.

In the NTSC system, the structure of the circuit shown in FIG. 6 is the same as that shown in FIG. 1. In the PAL system, if a signal is supplied from the input side of the switch circuit 52B to the noise reduction circuit, the chroma signal of the second line of the line having the dropout is lost. When successive two or thee lines have the dropout, the chroma signal of the second line and the fourth line is lost. This is because the chroma signal component circulated in the 1H delaying circuit 53 is canceled by the subtracting circuit 71. To prevent this problem, in the PAL system, an output signal of the switch circuit 52 is supplied to the noise reduction circuit.

Moreover, in the PAL system, when the dropout takes place, a dropout pulse delayed by 1H is used to stop the operation of the limiter 63. However, at this point, the level of the chroma signal decreases on an extra line after the dropout stops. To prevent this problem, in the PAL system, with the dropout pulse, the operations of the limiter 63 and the coefficient circuit 64 are controlled.

According to the present invention, in the NTSC system, an output signal of a 1H delaying circuit and a signal received from an input terminal are supplied to a subtracting circuit that forms a comb line filter. Thus, even if a dropout takes place in a luminance signal, not in a chroma signal, the subtracting circuit outputs the chroma signal at intervals of 1H. When a dropout takes place, the limit operation of a feedback loop that forms a noise reduction circuit is stopped and the coefficient thereof is increased. In the NTSC system, this process is performed with a dropout pulse delayed by 1H. Thus, the chroma signal can be obtained on the next line of the line having the dropout.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A video signal processing apparatus having a first line delaying circuit and a second line delaying circuit for processing a reproduction signal corresponding to an NTSC system, said apparatus comprising:

a switch circuit with first and second input terminals, said reproduction signal corresponding to the NTSC system being input to the first input terminal, an output signal of said first line delaying circuit being supplied to the second input terminal;

a comb line filter for subtracting the reproduction signal from an output signal of the first line delaying circuit; and a feedback type noise reduction circuit for extracting noise components from the reproduction signal and a reproduction chroma signal supplied through said second line delaying circuit, feeding back the noise components, and removing the noise components from the reproduction chroma signal, wherein when a dropout takes place, said switch circuit is connected to the first line delaying circuit so that the first line delaying circuit holds the reproduction signal that does not have the dropout, wherein said comb line filter subtracts an output signal of the first line delaying circuit from the reproduction signal that is input to the first terminal of said switch circuit, wherein an amplitude limiting signal element and an attenuating signal element of the feedback loop of said feedback type noise reduction circuit are removed; and wherein a chroma signal occurring in the next line of the reproduction signal is obtained when a dropout in a luminance signal in a current line of the reproduction signal occurs.

2. The video signal processing apparatus as set forth in claim 1, wherein the amplitude limiting signal element and the attenuating signal element in the feedback loop of said feedback type noise reduction circuit are controlled by a dropout pulse that is delayed by at least one line.

3. A video signal processing apparatus having a first line delaying circuit and a second line delaying circuit for processing a reproduction signal corresponding to an NTSC system or a PAL system, said apparatus comprising:

a switch circuit with first and second input terminals, said reproduction signal corresponding to the NTSC system or the PAL system being input to the first input terminal, an output signal of said first line delaying circuit being supplied to the second input terminal;

a comb line filter for subtracting the reproduction signal from an output signal of the first line delaying circuit in the NTSC system or for subtracting the reproduction signal from a reproduction signal supplied through the first line delaying circuit and a second line delaying circuit in the PAL system; and a feedback type noise reduction circuit for extracting noise components from the reproduction signal and a reproduction chroma signal supplied through said second line delaying circuit, feeding back the noise components, and removing the noise components from the reproduction chroma signal in the NTSC system or for extracting noise components from the reproduction signal and a reproduction chroma signal supplied through the first line delaying circuit and the second line delaying circuit, feeding back the noise components, and removing the noise components from the reproduction chroma signal in the PAL system, wherein when a dropout takes place, said switch circuit is connected to the first line delaying circuit so that the first line delaying circuit holds the reproduction signal that does not have the dropout, said comb line filter subtracts an output signal of the first line delaying circuit from the reproduction signal that is input to the first terminal of said switch circuit, and an amplitude limiting signal element and an attenuating signal element of the feedback loop of said feedback type noise reduction circuit are removed in the NTSC system, and wherein when a dropout takes place, said switch circuit is connected to the first line delaying circuit so that the first line delaying circuit holds the reproduction signal that does not have the dropout, and an amplitude limiting signal element and an attenuating signal element of the feedback loop that forms said feedback type noise reduction circuit are removed in the PAL system.

4. The video signal processing apparatus as set forth in claim 3, wherein the amplitude limiting signal element and the attenuating signal element in the feedback loop of said feedback type noise reduction circuit are controlled by a dropout pulse that is delayed by at least one line.

5. A video signal processing method used with first and second line delaying circuits for processing a reproduction signal, the method comprising the steps of:

switching between first and second input terminals to which said reproduction signal and an output signal of said first line delaying circuit are input, respectively;

subtracting the reproduction signal from an output signal of the first line delaying circuit;

feeding back noise components from the reproduction signal output from the second line delaying circuit to remove the noise components from a reproduction chroma signal of the reproduction signal; and obtaining a chroma signal occurring in the next line of the reproduction signal when a dropout in a luminance signal of a reproduction signal in a current line occurs.

6. The video signal processing method as set forth in claim 5, further comprising the step of controlling the feeding back of the noise components in accordance with a dropout pulse that is delayed by at least one line.

* * * * *